United States Patent [19]
Ogawa

[11] 3,976,169
[45] Aug. 24, 1976

[54] DISC BRAKE

[75] Inventor: Yutaka Ogawa, Tokyo, Japan

[73] Assignee: Akebono Brake Industry Co., Ltd., Japan

[22] Filed: Feb. 6, 1975

[21] Appl. No.: 547,503

Related U.S. Application Data
[63] Continuation of Ser. No. 397,599, Sept. 14, 1973, abandoned.

[30] Foreign Application Priority Data
June 25, 1973  Japan............................ 48-71460
Sept. 19, 1972  Japan............................ 47-108661

[52] U.S. Cl. ............................................. 188/73.3
[51] Int. Cl.² ........................................ F16D 65/02
[58] Field of Search............... 188/73.3, 73.5, 72.4, 188/72.5, 72.3, 216, 73.6; 277/33

[56] References Cited
UNITED STATES PATENTS

| | | | |
|---|---|---|---|
| 3,185,256 | 5/1965 | Schilling | 188/72.3 |
| 3,199,635 | 8/1965 | Bessler et al. | 188/73.3 X |
| 3,368,647 | 2/1968 | Laverdant | 188/73.3 |
| 3,374,866 | 3/1968 | Miles | 188/73.3 |
| 3,416,634 | 12/1968 | Swift | 188/73.3 |
| 3,664,469 | 5/1972 | Maurice | 188/72.9 |

FOREIGN PATENTS OR APPLICATIONS

| | | | |
|---|---|---|---|
| 1,251,102 | 9/1967 | Germany | 188/72.4 |
| 717,350 | 10/1954 | United Kingdom | 188/72.5 |

*Primary Examiner*—George E. A. Halvosa
*Attorney, Agent, or Firm*—McGlew and Tuttle

[57] ABSTRACT

A disc brake has friction pads which are supported by and guided through sockets provided in the legs of a fixed support which are positioned on both sides of a disc, while the head portion of the fixed support straddles the disc and connects the two legs. A caliper assembly has acting and reacting parts provided on opposite sides of the disc and a head portion connecting the acting and reacting parts and formed with a recess. The head portion of the fixed support extends into the recess of the caliper. A single bolt or pin, mounted in the head portion of the caliper extends through an aperture or bore in the head portion of the fixed support, or a single bolt or pin, mounted in the head portion of the fixed support, extends through an aperture or bore in the head portion of the caliper and serves as the sole support for the caliper assembly.

3 Claims, 4 Drawing Figures

DISC BRAKE

CROSS-REFERENCE TO RELATED APPLICATION

This application is a continuation of application Ser. No. 397,599, filed on Sept. 14, 1973, for "DISC BRAKE," now abandoned.

BACKGROUND OF THE INVENTION

In the conventional disc brakes, a caliper is slidably guided at two points on a fixed support. By contrast, in accordance with the present invention, a caliper is guided only at one point instead of two, so that the size of the disc brake can be minimized for application to small vehicles such as motorbicycles.

SUMMARY OF THE INVENTION

This invention relates to a disc brake for vehicles, and more particularly to a disc brake suitable for motorbicycles because of a compact structure which is made possible by reducing the sliding guide points, between a caliper and a fixed support, to only one point.

It is an object and a feature of this invention to provide a compact disc brake the size of which is reduced by an arrangement to support and guide a caliper assembly, comprising an acting part and a reacting part, on the head portion of the fixed support straddling the disc, while the braking operation is stabilized by supporting and guiding friction pads through the legs of the fixed support in such a way as to receive the brake torque with the fixed support.

Another feature of this invention lies in that a recess is provided in the caliper head connecting the acting and reacting parts of the caliper, and the head of a fixed support is placed in the recess of the caliper head in such a way as to support and guide the caliper thereby.

A further feature of this invention lies in that the caliper is guided on a one-end supported guide pin fixed to the head portion of the fixed support.

A still further feature of this invention lies in that the caliper is slidably guided on the fixed support by a two-end supported guide pin which, being arranged across the recess in the caliper, extends through the head portion of the fixed support and is fixed on two sides of the recess in the caliper head.

Still another feature of this invention lies in that the caliper is prevented from coming into a biased posture in the braking action and also the undesirable play thereof under a non-braking condition is eliminated by a plate spring provided in between the inner wall of the recess of the caliper and the head portion of the fixed support.

Another and still further feature of this invention lies in the excellent sealing ensured for the sliding part between the pin receiving hole, provided in the fixed support, and the above mentioned two-end supported guide pin of the caliper, with a boot and a spring provided in between one end of the guide pin and a notch formed at one end of the pin receiving hole in such a way as to press one end of the boot against the notch by means of the spring.

Other objects, features and advantages of the invention will be apparent from the following detailed disclosure, taken in conjunction with the accompanying drawings.

DESCRIPTION OF THE PREFERRED EMBODIMENTS

Figure 1:
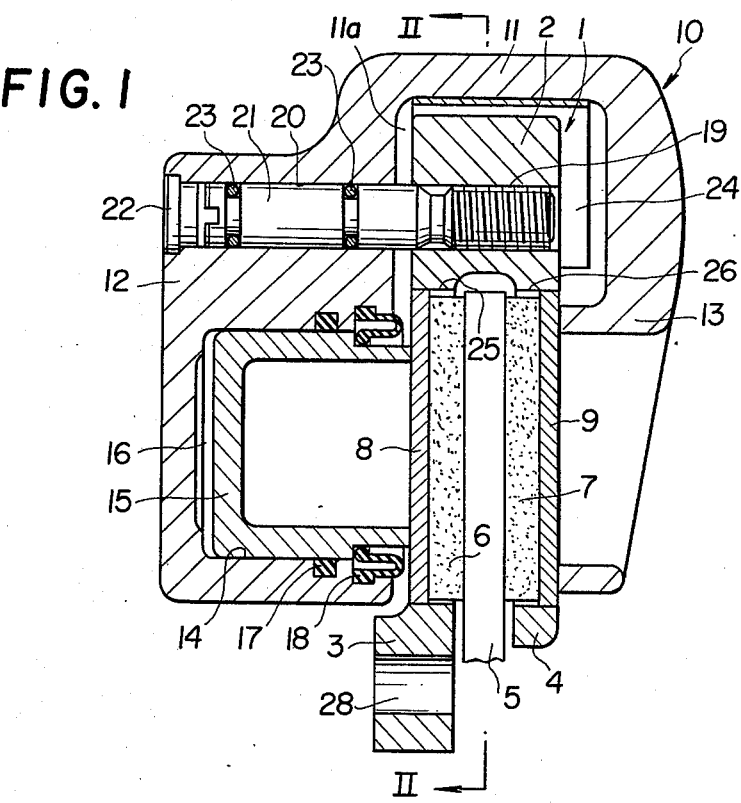
FIG. 1 is a transverse sectional view through one embodiment of a disc brake in accordance with the invention.
Figure 2:
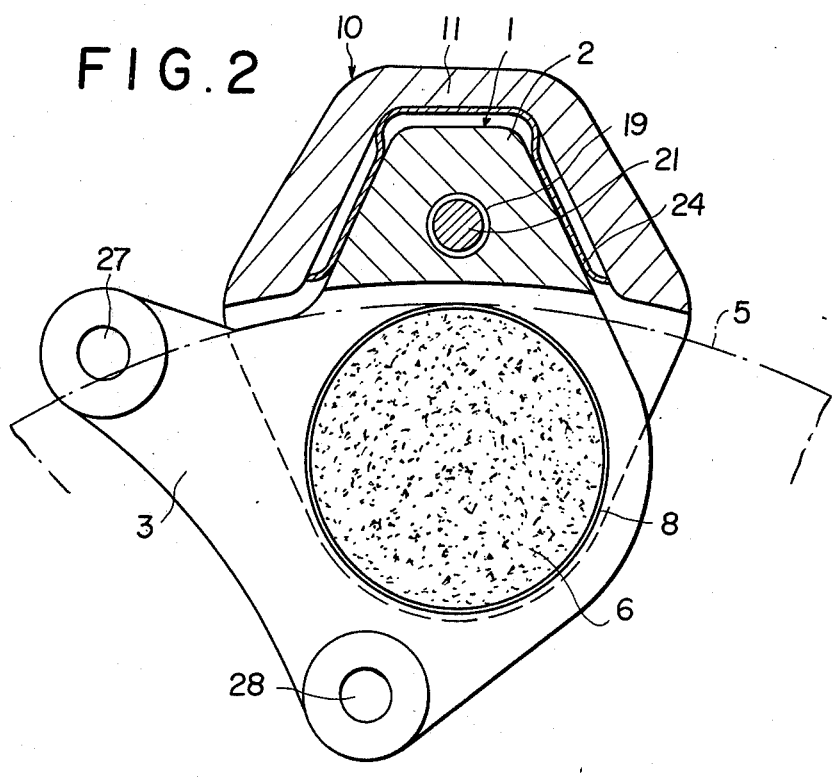
FIG. 2 is a sectional view taken on the line II—II of FIG. 1.

In the embodiment of the invention illustrated in FIGS. 1 and 2, a caliper having an acting part and a reacting part is guided by a guide pin which is supported by the head portion of a fixed support. The guide pin is designed to permit easy removal and reinsertion for easy replacement of friction pads when they wear out.

Furthermore, between the fixed support and the caliper, there is provided a plate spring, which serves to prevent the caliper from coming into a biased posture in braking operation and also to eliminate undesirable play thereof under a non-braking condition.

The embodiment of the invention shown in FIGS. 1 and 2 includes a fixed support 1, secured to a fixed portion of the vehicle, and having a head 2 interconnecting a leg 3, positioned on the inner side of a rotatable disc 5, and a leg 4 positioned on the outer side of disc 5. Legs 3 and 4 support respective friction pads 6 and 7 each having an associated backing plate 8, 9. A caliper 10 has a head 11 formed with a recess 11a, and includes a cylinder wall or part 12 and a reacting part 13, wall 12 being on the inner side of disc 5 and reacting part 13 being on the outer side. A cylinder 14 is formed in part 12 of caliper 10, and receives a piston 15 which defines, with the cylinder, a fluid chamber 16. A seal 17 is interposed between cylinder 14 and piston 15, and these two parts are also interconnected by a dust cover 18.

A threaded hole or bore 19 in the head 2 of support 1 has a guide pin 21 threadedly engaging therein and extending through a hole or bore 20 in the body of caliper 10. The outer end of pin 21 has a cap 22, and an O-ring 23 is engaged between pin 21 and hole 20. A plate spring 24 is inserted in recess 11a between head 2 of fixed support 1 and head 11 of caliper 10. Inner leg 3 of fixed support 1 has a socket 25 receiving the friction pad 6 and its backing plate 8, and outer leg 4 has a socket 26 receiving friction pad 7 and its backing plate 9. The fixed support 1 is further provided or formed with apertures 28 and 27 by means of which the fixed support may be secured to the fork of a motor bicycle, for example, or to another fixed support of a vehicle body.

The above embodiment operates as follows: When a fluid pressure is introduced into the fluid chamber 16, the piston 15 presses the friction pad 6 against the disc 5. Then, by the reaction to this, the caliper 10 slides on the guide pin 21. The sliding of the caliper presses the friction pad 7 against the disc to effect a braking action.

Since this embodiment has a structure wherein the circular friction pads 6 and 7 are fitted in circular sockets in the legs 3 and 4 of the fixed support in such a way as to receive the braking torque with the fixed support 1, it ensures a very stable braking operation.

The guide pin 21 is provided with the cap 22 and O-ring 23, which prevent the moisture and dust from entering. Furthermore, the guide pin 21 can be pulled out from the head 2 of the fixed support. This permits removal of the caliper body 10 from the fixed support 1 for easy replacement of the friction pads 6 and 7.

Figure 3:
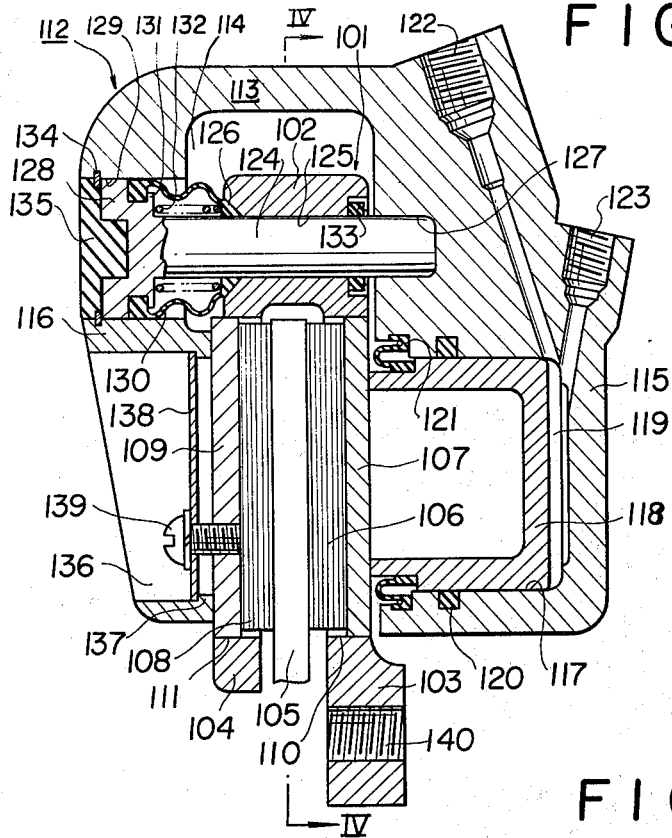
FIG. 3 is a view similar to FIG. 1 illustrating another embodiment of disc brake in accordance with the invention.
Figure 4:
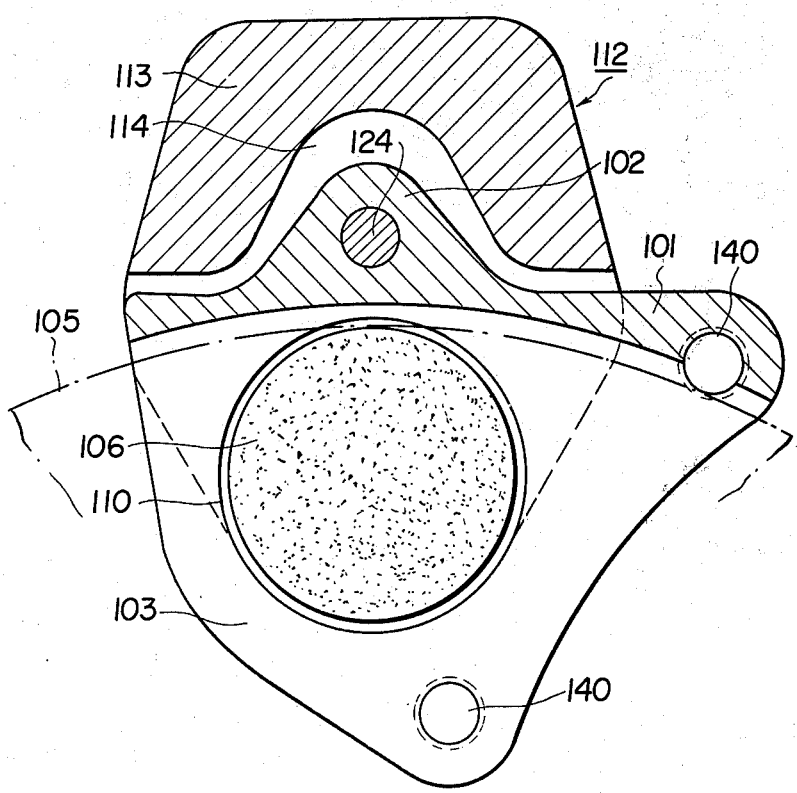
FIG. 4 is a sectional view taken on the line IV—IV of FIG. 3.

In the embodiment, shown in FIGS. 3 and 4, a guide pin which is fixed on both sides of a caliper is inserted in a pin receiving hole provided in the fixed support thus extending through the head of the fixed support in such a manner that the caliper can slide along the fixed support. The strength of the guide pin is increased by this arrangement. There is provided a notch at one end of the pin receiving hole in the support head and also at one end of the sliding part between the hole and the guide pin of the caliper. Then, one end of a boot is pressed by a spring against the notch by the force of a spring, so that an excellent sealing effect can be attained.

Referring to FIGS. 3 and 4, a fixed support 101 is arranged to be fixed to a rigid part of the vehicle structure and is positioned to straddle a disc 105. Support 101 includes a head 102 interconnecting a leg 103, positioned on the inner side of a rotatable disc 105, and a leg 104, positioned on the outer side of disc 105. Legs 103 and 104 support respective friction pads 106 and 108, each having an associated backing plate 107, 109. Leg 103 is provided with a recess or a guiding surface 110 for friction pad 106 and its backing plate 107, and leg 104 has a similar recess or guiding surface 111 for the backing plate 109 of friction pad 108.

The disc brake includes a caliper 112 having a head 113 formed with a recess 114 receiving the head of fixed support 101. Caliper 112 includes a cylinder part 115, on the other side of disc 105, and the reacting part 116, on the other side of disc 105. Cylinder part 115 is formed with a cylinder 117 slidably receiving a piston 118 defining therewith a fluid receiving chamber 119 connected to a fluid inlet 122 and to a threaded bore 123 for a bleeder. A seal 120 is interposed between cylinder 117 and piston 118, and the inner ends of these two parts are interconnected by a boot 121.

A caliper guide pin 124, serving as the sole support for caliper 112 on fixed support 101 and as a guide in a direction parallel to the disc axis, extends through a bore 125 and head 102 of the fixed support and into a blind bore 127 in the cylinder part 115 of the caliper. One end of bore 125 is bevelled outwardly to form a notch 126. A flange 128 on guide pin 124 is slidable in an enlarged bore 129 in reacting part 116 of the caliper, and a boot 130 extends between notch 126 and flange 128 and encloses a spring 132 extending between a shoulder 131, on pin 124, and the inner end of the boot. A wiper seal 133 is mounted in a recess at the opposite end of bore 125 in engagement with pin 124, and a snap ring 134 maintains pin 124 in position and is covered by a rubber cap 135. Reacting part 116 of the caliper is further formed with an enlarged hole or aperture 136 having a shoulder 137. A check plate 138 and backing plate 109 of friction pad 108 are connected by a bolt 139 with the shoulder 137 of reacting part 116 being interposed between plate 109 and plate 138. The fixed support 101 is provided with apertures 140 for securing the same to a fixed part of the vehicle, such as the fork of a motor bicycle.

When a fluid pressure is introduced into the fluid chamber 119 through the fluid inlet 122, the piston 118 presses the inner friction pad 106 against the disc 105. Then, by the reaction to this, the guide pin fixed to the caliper 101 slides along the pin receiving hole 125. This causes the outer friction pad 108 of the reacting part 116 to press the disc 105 and thus to apply the brake.

The guide pin 124 comes to gradually move to the right together with the caliper 101 as the friction pads wear away. Since one end of the spring 132 is in contact with the shoulder 131 of the guide pin 124, it comes to strongly press the end of the boot 130 as the pin moves, so that an increased sealing effect can be attained. The wiper seal 133 seals the sliding part between the guide pin 124 and the pin receiving hole 125.

One end of the guide pin 124 of the caliper being fitted into the blind hole 127 and the other end being fitted into the flange inserting hole 129, the pin is fixed to the caliper at both ends thereof. This arrangement ensures stability in terms of structural strength.

The check plate 138 is fitted against the shoulder 137 of the hole of the caliper in such a manner that the plate does not turn round in the caliper hole 136. Then, with the outer friction pad 108 joined with the check plate 138 by means of the bolt 139, this not only prevents the outer friction pad from turning round but also prevents the whole caliper assembly 112 from rotating or oscillating on the guide pin 124. It has been ascertained through experiments that neither the inner friction pad 106 nor the outer friction pad 108 turns in the braking operation. However, if so required, the inner friction pad may also be provided with an additional means of checking rotation.

While specific embodiments of the invention have been shown and described in detail to illustrate the application of the principles of the invention, it will be understood that the invention may be embodied otherwise without departing from such principles.

What is claimed is:

1. A disc brake, for small vehicles, comprising, in combination, a rotatable brake disc; a fixed support secured to a rigid part of the vehicle structure and constituted by two leg portions, positioned on respective opposite sides of said disc, and a head portion straddling said disc and interconnecting said two leg portions; each leg portion having a friction pad guiding part; respective friction pads mounted in said guiding parts and positioned on opposite sides of said disc; a caliper assembly constituted by two caliper leg portions positioned on respective opposite sides of said disc and constituting, respectively, an acting member and a reacting member, and a caliper head portion interconnecting said caliper leg portions; a single guide pin extending through an aperture formed in the head portion of said fixed support parallel to the axis of said disc, and extending through said caliper head portion to mount said caliper assembly on said fixed support at a point above the outer circumference of said disc to guide said caliper assembly in a direction parallel to the axis of said disc; and mechanism fixedly securing said reacting part, at a point spaced very substantially from said guide pin, to that friction pad disposed adjacent said reacting part at a point on said pad spaced very substantially from said guide pin; said mechanism positively preventing any swinging of said caliper about said guide pin relative to said fixed support by virtue of the relatively very long torque arm resulting from the location of said mechanism at such points spaced very substantially from said guide pin; said mechanism constituting the sole means restraining swinging of said caliper about said guide pin relative to said fixed support; whereby backlash of said caliper, responsive to a braking operation, is positively prevented.

2. A disc brake for small vehicles, as claimed in claim 1, in which said single caliper guide pin has a central portion extending through a bore in an extension of said head portion of said stationary support, a first end engaged in a blind bore in one side of said head portion of said caliper assembly and a second end extending in a bore in the other side wall of said head portion, said bores being axially aligned with each other.

3. A disc brake for small vehicles, as claimed in claim 1, wherein said mechanism comprises a bolt connecting said friction pad adjacent said reacting part to a plate fixed in said caliper, said reacting part including a portion positioned between said friction pad and said plate.

* * * * *